June 12, 1934.    A. T. FLETCHER    1,962,238
GLASS CUTTER
Filed May 31, 1932
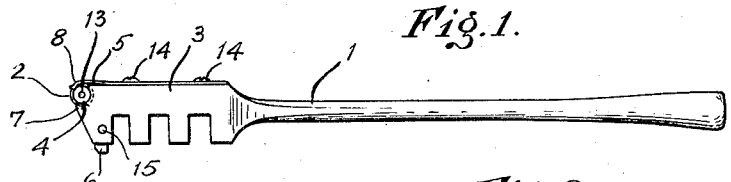
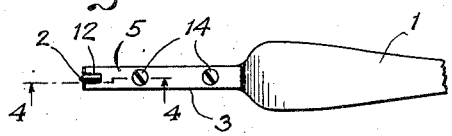
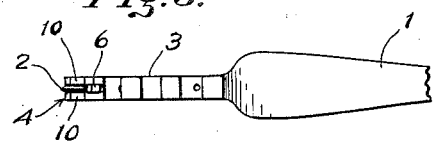
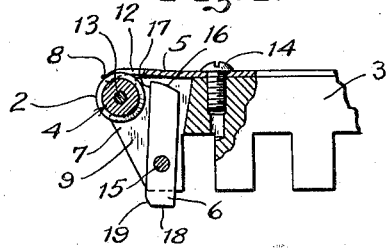
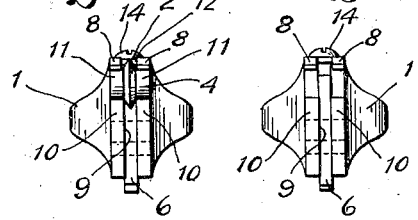
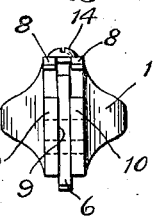
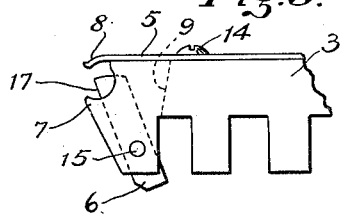
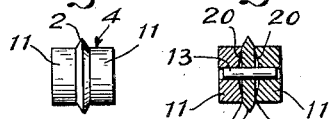
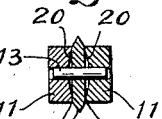
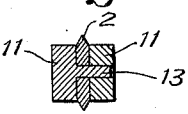
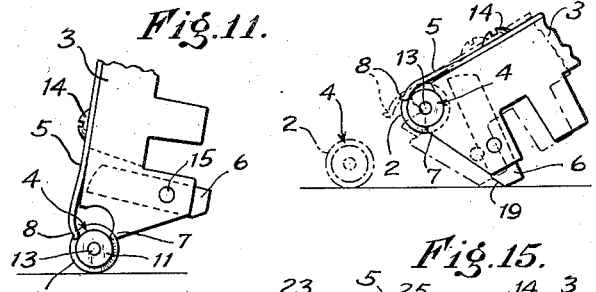
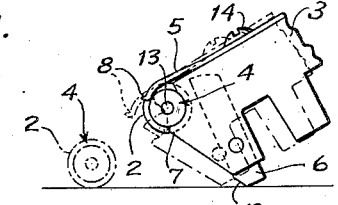
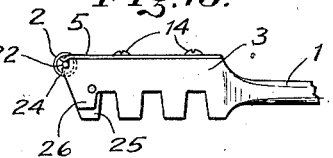
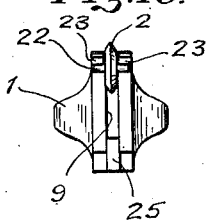
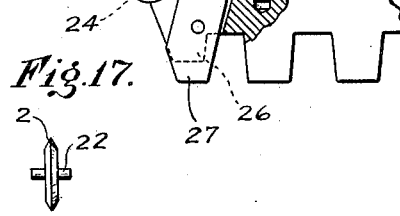
INVENTOR
ARTHUR T. FLETCHER
BY
ATTORNEY.

Patented June 12, 1934

1,962,238

UNITED STATES PATENT OFFICE 1,962,238

GLASS CUTTER

Arthur T. Fletcher, Bristol, Conn.

Application May 31, 1932, Serial No. 614,421

32 Claims. (Cl. 49—52)

My invention relates to glass cutters.

It has among its objects to provide an improved glass cutter and, more particularly, an improved glass cutter of the cutter wheel type. A further object of my invention is to provide such a glass cutter having improved means for mounting the cutter wheel upon a holder, which, while securely locating the wheel during use, also enables the same to be both quickly and conveniently attached in operative position and to be quickly and conveniently removed whenever it is desired to substitute a new cutter wheel. A still further object of my invention is to provide an improved holder having improved cutter wheel holding means and improved cutter wheel releasing means, one adapted to permit the cutter wheel to be readily snapped into holding position, and the other adapted to permit the wheel to be snapped out of holding position, while both means are adapted to be operated in a very convenient manner. A still further object of my invention is to provide an improved cutter wheel unit adapted to use in connection with the cutter holding and releasing means, and itself of an improved construction and adapted to be mounted in an improved manner on the holder in such manner as to minimize wear on the latter. These, and other objects and advantages of my improved construction will, however, hereinafter more fully appear.

In the accompanying drawing, I have shown, for purposes of illustration, several embodiments which my invention may assume in practice, the same, while not limited thereto, being illustrated in connection with a type of holder adapted to be held in the hand.

In the drawing,—

Fig. 1 is a side elevation of one form of cutter constructed in accordance with my invention.

Fig. 2 is a top plan view of the construction shown in Fig. 1, the handle being broken away;

Fig. 3 is a bottom plan view of the construction shown in Fig. 1;

Fig. 4 is an enlarged sectional view of the cutter wheel carrying end of the holder, the section being taken on line 4—4 of Fig. 2 and showing the cutter wheel in position in the holder;

Fig. 5 is a view similar to Fig. 4, but in side elevation and with the cutter unit removed from the holder;

Fig. 6 is an end view of the holder with the unit in position therein;

Fig. 7 is a view similar to Fig. 6, but with the unit removed, and with the releasing member in the same position shown in Fig. 5;

Fig. 8 is a side elevation of one form of my improved cutter wheel unit;

Fig. 9 is a longitudinal sectional view of the same;

Fig. 10 is a view similar to Fig. 9, but showing a modified construction;

Fig. 11 is a side elevation of the lower end of the holder and the unit showing the same in the position occupied when ready to be snapped into assembled relation;

Fig. 12 is a similar view but showing the parts ready to be released by the releasing means, with the latter and the unit also shown in released position;

Fig. 13 is a side elevation similar to Fig. 1, of a modified construction;

Fig. 14 is a top plan view of this construction;

Fig. 15 is an enlarged partial sectional view, similar to Fig. 4, showing this construction;

Fig. 16 is an end view of this construction with the cutter wheel therein;

Fig. 17 is an enlarged detail of the cutter unit used in this modification.

Referring first to the construction shown in Figures 1 to 12, it will be noted that I have shown a holder having a handle 1 carrying a cutter wheel 2 at one end of the body 3 thereof, and having this cutter wheel 2 mounted on an improved unit 4 which is, in turn, held in position by improved holding means including a spring 5, and also releasable by improved releasing means including a releasing member 6, in an improved manner hereinafter described.

Referring more particularly to the body 3, it will be noted that, while the same is, generally speaking, of usual shape, it is herein provided with improved means for enabling it to carry my improved cutter unit and my improved holding and releasing means for the latter. As shown in Figures 1, 4 and 5, this body herein is provided at the top of its free end with an improved unit support 7, herein in the form of an aperture or notch, open at the front end and both sides and substantially semi-circular in shape, which extends backward at an angle from its front extremity in such manner as to cause the free end 8 of the spring 5 to overhang the same. As shown, the extremity 8 of the spring 5 is also both curved upward and extended downward in such manner as to be readily deflected by the unit and substantially to fit the unit 4 and engage the latter at one side of and above its axis, all in such manner as to co-operate effectively with the support 7 in both facilitating insertion and holding the unit 4 securely in its snapped in or operative position. Thus it will be noted that the support 7 and spring end 8 co-operate to provide a longitudinally opening unit holding socket into which the unit 4 is adapted to be snapped when forced longitudinally of the holder beneath the free end 8 of the spring and above the seat 7.

While my improved snap type holding means may assume different forms, attention is here directed to the new bifurcated construction of the same provided to permit them to co-operate with my improved unit 4. As shown, the front end of the body 3 is vertically and longitudinally slotted as shown at 9 in such manner as to provide a plurality of spaced portions 10 on opposite sides of the body, each carrying a support 7 adapted to support discs 11 on opposite sides of the wheel 2 of the unit. Further, it will be observed that the free end of the spring 5 is herein also longitudinally slotted at 12 in such manner as to provide a plurality of depending holding fingers 8 adapted to co-operate with the plurality of supports 7 in positioning the unit 4, while permitting the wheel 2 to rotate freely therebetween on an axle 13 carried by the discs 11. Attention is further directed to the fact that the spring 5 is suitably clamped to the top of the body 3 by one or more screws 14, so spaced from the extremity 8 as to permit the adjacent portion of the spring 5 to move as necessary during the insertion or removal of the unit. Thus it will be observed that when the unit 4 is in the position illustrated in Figures 1 and 4, since each of its discs 11 is positioned by a support 7 and a portion 8 of the spring, the unit 4 is securely positioned in balanced relation on the holder, while the cutter wheel 2 is freely rotatable between and guided by the discs 11.

The releasing means are carried on the body 3 in such manner as to be adapted to eject the unit 4 whenever desired from the position heretofore described. Herein, these means assume the form of a pivoted releasing member 6 disposed in and filling the entire width of the slot 9. As shown, this member is pivoted adjacent its outer end on a transverse pivot 15 and is of such length as to have its inner end extend inside said pivot to a point at one side of and preferably above the axis of the cutter wheel 2, herein to a point just below the spring 5. In this construction, the inner end of the member 6 is also preferably cut away angularly, as shown at 16, in order to avoid engagement of the same with the spring as the member 6 is moved about its pivot, while providing an elongated front abutment surface 17 adapted to engage the cutter wheel 2 in rear of its axis. Herein, it will also be noted that the slot 9 in the body 3 extends backward in the latter to a sufficient extent to enable the member 6 to assume an inoperative position out of contact with the wheel 2, although when the member 6 is made of ordinary soft metal, the latter will have no appreciable effect upon the harder cutter wheel 2 even should the parts come into contact. Attention is further directed to the fact that a projecting or operating end 18 of the member 6 is herein also provided on the outer end of the latter which projects below the body 3 and is provided with a cutaway corner 19 at its front edge adapted to provide an abutment surface.
Thus it will be evident that by pressing this portion 19 against any convenient object, the portion 17 thereon will be caused to press against the wheel 2 and thereby eject the unit 4 from between the spring ends 8 and the seats 7.

Referring more particularly to the unit 4, attention is directed to Figures 8, 9 and 10, which show a preferred and modified construction of unit which may be used. As shown in each of these figures, the discs 11 are preferably of substantially the same diameter as the main or body portion of the cutter wheel 2 and extend to the base of the bevelled cutting edge thereof. Further, they are preferably of substantial width, each herein being substantially twice as wide as the wheel 2 and of such width that their outer surfaces lie flush with the outer side surface of the body 3 when disposed therein. It will also be noted, that with the wheel therebetween and the axle 13 driven on or swedged to the discs, a unitary construction is provided and one which is of such size as to be conveniently handled and also minimize the annoyance and expense arising from loss. Attention is further directed to the fact that by using relatively wide discs it is also possible to provide a unit which can support itself on edge with the cutter wheel substantially vertical, and the discs on opposite sides thereof readily accessible from the top. The location of the cutter wheel 2 between these discs 11 also acts to enable the cutter wheel to be definitely located in position therebetween with a close running fit, in such manner that, while the wheel is freely rotatable on the axle, wobbling of the wheel is minimized with resultant increase in accuracy.

In a preferred form of my improved unit, I also provide the discs 11 with suitable chambered inner ends 20, herein concave, adapted to provide a rim portion 21 serving to locate the wheel 2 against wobbling, while also providing a chamber inside the portion 21 adapted to receive a suitable lubricant, as for example, a graphite composition, and thereby provide a source of lubrication for the wheel 2 on its axle 13. Also in a preferred construction I make the discs 11 of bronze or a hardened steel having long wearing qualities, in such manner to make them particularly adapted to resist wear when disposed in their stationary operative position between the supports 7 and the holding portions 8 on the spring 5. While preferably the unit has an independent axle member 13 of bronze, suitably connected by swedging or the like to both discs, I can also if desired, form this axle member integrally with one of the discs 11 and project it thru the wheel 2 and the other disc 11 and swedge or otherwise suitably attach it to the latter, as shown in Figure 10. It will also of course be evident, that if desired, the chamber 20 may be omitted as shown in that figure, the whole sides of the discs adjacent the wheel 2 then forming positioning means preventing wobbling of the wheel.

In the use of my improved construction, when it is desired to assemble the unit 4 in the handle, the parts are first brought into the relative position shown in Figure 11. In that position, it will be noted that the body 3 is endwise above the unit 4 with the ends of the supports 7 and of the spring portions 8 engaging different discs 11 on opposite sides of the axis of the unit in such manner as to locate the latter against lateral movement beneath the space between the adjacent extremities of 7 and 8. Thus, when the body 3 is simply pressed downward, the spring portion 8 will yield laterally, bowing back the spring 5, and the unit 4 will be snapped into its holding position with its spaced discs 11 engaging the spaced supports 7 and be securely held in position thereon by the ends 8 which engage the opposite sides of the discs. After assembly, it will also be evident that since the ends of the discs 11 lie in the plane of the flat sides of the body 3, the latter will be usable with entire freedom relative to a straight edge or the like, in a usual manner. Of course, during use, the wheel 2 will continue to be definitely located by the combined action of the spring ends 8 and the discs 11 in such manner as to insure accurate cutting, while the spring ends 8, being under tension, will also act to take up wear. It will also be evident that the releasing member 6 will in no way interfere with the rotation of the cutter wheel 2, the rotation of the latter tending to kick the releasing member 6 out of its path, although, as brought out above, even should these two parts engage, the hard steel cutter wheel will be in no way damaged by the softer metal of the releasing member. Of course, during use the graphite contained in the chamber 20 will also serve to facilitate the rotation of the wheel 2 over a long period of time, a single charge of graphite ordinarily sufficing for the life of the wheel. When, however, the wheel 2 becomes dull and it is desired to substitute a new one, this may be readily accomplished by ejecting the unit 4 and substituting a complete new unit. To eject the used unit, the parts are preferably placed in the angled position shown in Figure 12 with the portion 19 engaging any suitable support. Then, by simply pressing down on the edge 19 of the member 6, the upper end 17 of the latter is forced against the wheel 2 to expel the latter and the complete unit 4 from the holder, when the spring portions 8 are sufficiently expanded laterally by this pressure to release the discs 11 and accordingly permit the latter to pass out of the holder.

As a result of my improved construction, it will also be evident that, through the use of the supporting discs which are held stationary in the holder, wear on the latter is minimized in such manner as substantially to increase the life of the holder, the wear instead being taken on the discs, which are, of course, readily replaceable by the mere substitution of a new unit. Further, it will be noted that since the chance of returning the unit to the same angular position previously occupied is very small, the wear may be distributed over any unit in an improved manner by simply snapping the unit out of the holder from time to time and then snapping it back. Attention is further directed to the fact that by using discs of relatively large diameter, as compared with the diameter of the axle, it is also possible to increase not only the area, but the number of minutely different positions which the discs may occupy relative to supports 7 and spring portions 8, each of which, since it will present a new portion engaging these parts, and particularly the parts 8, will accordingly in effect constitute a fresh unworn holding position. These, and other advantages of my improved construction will, however, be clearly apparent to those skilled in the art.

In the construction shown in Figures 13 to 17, I have shown a generally similar form of my invention, but one in which the discs 11 are omitted and an axle member 22 is directly mounted between a modified form of spring end 23 and a modified form of support 24. Herein, as preferably, the axle 22 corresponds generally to axle 13, and is suitably swedged to hold the wheel thereon and constitute a unit therewith, although, of course, the wheel can be mounted on a separable axle pin if desired. Also, it will be noted that the spring end 23 is bent down and then up to form a shorter holding spring, while the holding surface is in the form of a small notch of suitable form, herein having inner walls at right angles, adapted to position the axle 22 when the spring ends 23 engage therewith at points on the opposite sides of the axle from the intersection of the walls. As shown, a releasing member 25 is also provided, generally similar to that previously described, but herein longer than the first prong 26 on the body 3, and provided with a lower end 27, which, in shape and effect, forms the protruding end of the prong or tooth 26. Obviously, this construction will function generally similarly to that previously described, although not so conveniently, more manual guiding, for example, being required during assembly of a unit comprising merely a cutter wheel and an axle, than is the case where the discs 11 are used, while, of course, the wear on the holder will also be greater.

While I have in this application specifically described these illustrative forms of my invention, it will be understood that the same are used for illustrative purposes and that the invention may be further modified and embodied in other forms without departing from its spirit or the scope of the appended claims.

What I claim as new and desire to secure by Letters Patent is:—

1. In combination with a glass cutter holder, a cutter unit having a cutter wheel and symmetrical lateral supports, and co-operating means on said holder for automatically connecting said unit and holder upon pressing said supports into engagement with said means when said supports are in any of different angular positions relative to said means.

2. In combination, a glass cutter unit having a cutter wheel and having within the peripheral limits thereof lateral guide discs relative to which said wheel is rotatable, and a unit support having normally open unit holding means for automatically operatively positioning said unit therein when said means and said discs are pressed together in any of different angular positions of said discs relative to said means.

3. In combination with a glass cutter unit support, a cutter unit having a cutter wheel and rigid lateral supports therefor disposed within the peripheral limits of said wheel, and co-operating means at an edge of said unit support for automatically grasping and positioning said lateral supports in said means upon pressing said supports into the latter from said edge.

4. In a glass cutter, a holder having thereon cutter holding means including a longitudinally opening cutter socket and a holding member overlying said socket, and cutter carrying means in said socket engaged by said holding member.

5. In a glass cutter, a holder having socket forming means in its end including a longitudinally opening cutter socket and a movable holding member overlying said socket, cutter carrying means, and means for actuating said holding member to receive and hold said cutter carrying means in said socket upon relative longitudinal movement of the parts.

6. In a glass cutter, a holder having thereon a longitudinally opening cutter socket and an overlying holding member movable relative thereto, cutter carrying means, and means on said socket, member, and means for effecting seating of said means in said socket and reverse automatic movements of said holding member out of and into holding position upon relative movement of said holder and cutter carrying means.

7. In a glass cutter, a holder having thereon an open socket forming means in its end including a longitudinally opening seat and an overlying resilient holding means, and cutter carrying means receivable in said seat and carrying means for actuating said holding means to grip and release said cutter carrying means upon reverse movements of the latter relative thereto.

8. In a glass cutter, a holder having a longitudinally opening socket in its end and resilient means overhanging said socket, and cutter carrying means for actuating said resilient member receivable in said socket and engageable by said socket and said resilient member on opposite sides of its own axis.

9. In a glass cutter, a holder having normally open socket forming means in its end including spaced resilient snap holding means and a bifurcated cooperating relatively stationary unit support having a longitudinally opening socket beneath said holding means, and a cutter carrying unit having a cutter wheel rotatable between the portions of said snap means and support and also supporting means on opposite sides of said wheel adapted to be snapped into operative position in said socket forming means.

10. In a glass cutter, a holder having normally open socket forming means in its end including spaced resilient snap holding means and a bifurcated cooperating relatively stationary unit support having a longitudinally opening socket beneath said holding means, and a cutter carrying unit having a cutter wheel rotatable between the portions of said snap means and support and also stationary supports on opposite sides of said wheel held in stationary position in said stationary support by said snap means.

11. In a glass cutter, a holder having longitudinally opening socket forming means in its end including a bifurcated stationary unit support having longitudinally opening sockets therein and spring means overhanging the spaced portions of said support and said sockets, and a cutter carrying unit adapted to be snapped into operative position in said means comprising end discs and a wheel rotatable therebetween, said discs being movable beneath said spring means and held thereby in engagement with said sockets and said wheel being rotatable between the portions of said supports and said spring means.

12. In combination, a glass cutter unit having a cutter wheel, a journal therefor, and lateral journal supporting and wheel guiding means larger than said journal and within the peripheral limits of said wheel relative to which the latter is rotatable, a unit support, and means for operatively positioning said supporting and guiding means in stationary operative position in said unit support with a portion of the wheel periphery projecting beyond an edge of said support and said journal supporting and wheel guiding means.

13. In combination, a glass cutter unit having a cutter wheel, a journal therefor, and lateral journal supporting and wheel guiding means larger than said journal and within the peripheral limits of said wheel relative to which the latter is rotatable, a unit support, and means for operatively positioning said supporting and guiding means in stationary operative position in said unit support with a portion of the wheel periphery projecting beyond an edge of said support and said journal supporting and wheel guiding means, said supporting and guiding means comprising discs and said positioning means having portions grasping peripheral portions of said discs therebetween.

14. In a glass cutter, a body, a cutter carried in operative position thereon, and means on said body for bodily ejecting said cutter from said position and body at will.

15. In a glass cutter, a body, a cutter unit carried in operative position thereon, and cutter unit ejecting means carried by said body and ejecting said unit bodily at will having an ejecting portion in said body and a projecting operating portion.

16. In a glass cutter, a body, a cutter carried in operative position thereon, and means on said body for ejecting said cutter from said position at will having an operating portion extending below said cutter outside the limits of said body.

17. In a glass cutter, a body having socket forming cutter positioning means in its front end having a longitudinally opening aperture and openable automatically by cutter carrying means to receive and hold the latter when the same is pressed into the opening in said first mentioned means.

18. In a glass cutter, a body having socket forming means in its front end comprising a stationary support having a longitudinally opening socket and a resilient member overhanging said socket and openable automatically to receive and hold therein a cutter unit when the latter is pressed toward said socket beneath said member.

19. In a glass cutter, a body having socket forming means in its front end comprising a bifurcated stationary support having longitudinally opening sockets therein and co-operating resilient members having sloping ends overhanging said socket and openable automatically to receive and hold therein a cutter unit when the latter is pressed toward said socket against said ends.

20. In a glass cutter, a body having socket forming means in its front end comprising a bifurcated stationary support and co-operating resilient members overhanging said support and openable automatically to receive and hold a cutter unit when the latter is pressed against said means, and means movable between the bifurcated portions of said support for ejecting a cutter unit.

21. A cutter wheel unit for glass cutters comprising a plurality of spaced supporting members, a journal carried thereby, and a wheel freely rotatable relative to said members and guided thereby and carried on said journal between said members.

22. A cutter wheel unit for glass cutters comprising a plurality of spaced supporting discs, a journal carried thereby and extending therebetween, and a wheel freely rotatable relative to said discs and guided by adjacent faces thereof and carried on said journal between said discs.

23. A cutter wheel unit for glass cutters comprising a journal, a wheel carried on said journal, supporting means carrying said journal and relative to which said wheel is freely rotatable, and guiding means on said supporting means and inside the latter on opposite sides of said wheel for inhibiting wobbling of the latter.

24. A cutter wheel unit for glass cutters comprising a plurality of spaced supporting discs, a journal carried thereby, a wheel on said journal freely rotatable between and guided by adjacent faces of said discs, and means on one of said discs forming a lubricant chamber adjacent said wheel.

25. A cutter wheel unit for glass cutters comprising a plurality of relatively stationary spaced supporting discs, a journal of smaller cross section than said discs carried thereby and extending therebetween, and a cutter wheel rotatable on said journal and rotatable relative to and between said discs and guided by the latter adjacent the wheel periphery.

26. A cutter wheel unit for glass cutters comprising a plurality of spaced journal supporting members, a journal extending between the inside faces of said members presenting a reduced portion therebetween, and a cutter wheel on said journal portion rotatable relative to and guided by the inside faces of said members.

27. A cutter wheel unit for glass cutters comprising a plurality of spaced journal supporting members, a journal between the inside faces of said members presenting a reduced portion therebetween, and a cutter wheel on said journal portion rotatable relative to and guided by the inside faces of said members, said members having symmetrical peripheral portions larger than said journal and smaller than said wheel.

28. A cutter wheel unit for glass cutters comprising a plurality of spaced journal supporting members, a journal between the inside faces of said members presenting a reduced portion therebetween, and a cutter wheel on said journal portion rotatable relative to and guided by the inside faces of said members, said reduced portion being integral with one member and extending into and rigidly connected to the other and having said wheel rotatable thereon.

29. In a glass cutter, a holder having a bifurcated end and longitudinally opening notches in the latter, spaced spring members overhanging said notches therein, spaced supporting discs in said notches held stationary by said spring members, a journal positioned in said discs providing a reduced portion between the same, and a cutting wheel rotatable on said portion and projecting beyond said discs and holder.

30. In a glass cutter, a holder having a bifurcated end and longitudinally opening notches in the latter, spaced spring members overhanging said notches therein, spaced supporting discs in said notches held stationary by said spring members, a journal positioned in said discs providing a reduced portion between the same, a cutting wheel rotatable on said portion and projecting beyond said discs and holder, and means on said holder for at will ejecting said discs, journal and wheel as a unit from said holder.

31. In a glass cutter, a holder having a bifurcated end and longitudinally opening notches in the latter, spaced spring members on said holder having ends overhanging said notches, and a cutter unit having a cutter wheel and an axle for the latter extending in opposite directions therefrom, said axle being receivable in said notches beneath said spring ends and positioned thereby, and said wheel being rotatable on said axle in the space between said bifurcated ends and said spring ends.

32. In a glass cutter, a holder having a notched bifurcated end, spaced spring members on said holder having ends overhanging each side of the notch therein, and a cutter unit having a cutter wheel and an axle for the latter extending in opposite directions therefrom, said axle being receivable in said notch beneath said spring ends and positioned thereby, and said wheel being rotatable on said axle in the space between said bifurcated ends and said spring ends, and unit ejecting means disposed in said bifurcated end and having a projecting portion movable to effect ejection of said cutter unit.

ARTHUR T. FLETCHER.